Sept. 9, 1924.

C. F. PRATT 1,507,853

AUXILIARY AIR INLET DEVICE

Filed May 11, 1922

INVENTOR
CECIL F. PRATT
BY Dewey Strong
Townsend and Loftus
ATTYS.

Patented Sept. 9, 1924.

1,507,853

UNITED STATES PATENT OFFICE.

CECIL F. PRATT, OF SAN FRANCISCO, CALIFORNIA, ASSIGNOR TO SPHINX PRODUCTS CORPORATION, OF SAN FRANCISCO, CALIFORNIA, A CORPORATION OF CALIFORNIA.

AUXILIARY AIR-INLET DEVICE.

Application filed May 11, 1922. Serial No. 560,016.

*To all whom it may concern:*

Be it known that I, CECIL F. PRATT, a citizen of the United States, residing at the city and county of San Francisco and State of California, have invented new and useful Improvements in Auxiliary Air-Inlet Devices, of which the following is a specification.

This invention relates to fuel vaporizers and particularly pertains to an auxiliary air vaporizer adapted for use in connection with internal combustion engines.

It is the principal object of the present invention to provide a simple auxiliary air inlet device which may be readily installed on an automobile motor, and which will aid the carbureter in producing a thoroughly atomized and highly combustible mixture, thereby increasing the efficiency of the motor and decreasing the fuel consumption thereof, said device automatically operating to increase the proportion of air in the gaseous mixture as the engine accelerates.

The invention contemplates the use of a device constructed so that it may be interposed between the intake manifold of a motor and the carbureter, the device embodying a valve mechanism adapted to be actuated by the suction of the motor to admit air to the manifold in quantities in direct proportion to the varying speed of the motor, the structure also supporting a screen in the manifold whereby fuel delivered from the carbureter will be thoroughly atomized before entering the cylinders.

One form which the invention may assume is exemplified in the following description and illustrated by way of example in the accompanying drawings, in which.

Referring more particularly to the drawings, 10 indicates an auxiliary vaporizer. This device comprises a head member 11 which is formed with a flat upper portion 12 agreeing in shape with the adjacent bolting flanges of an intake manifold 13 and a carbureter 14 of an internal combustion engine.

Figure 1:
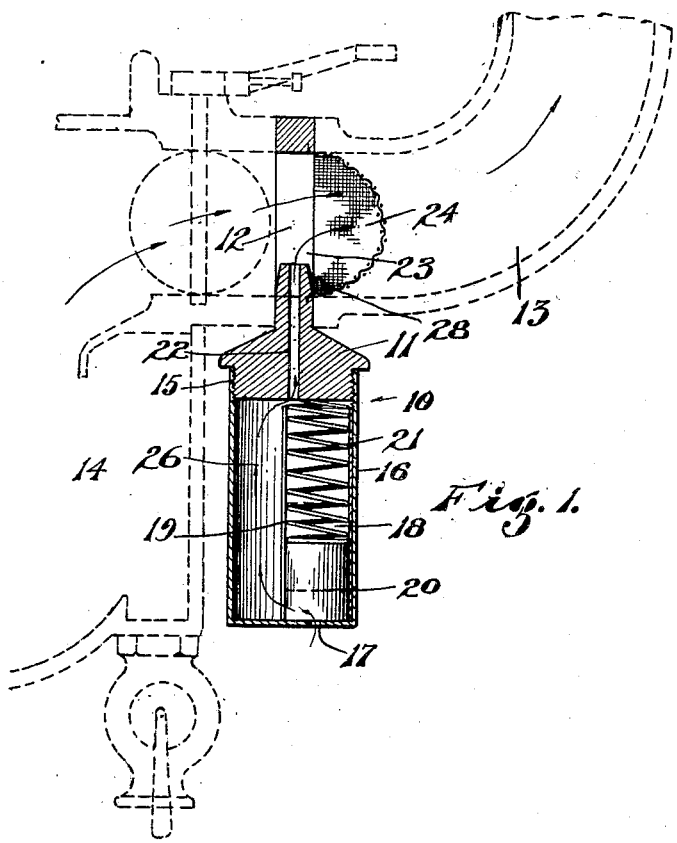
Fig. 1 is a view in section illustrating the preferred form of the invention applied to the intake manifold and the carbureter of an internal combustion engine.
Figure 2:
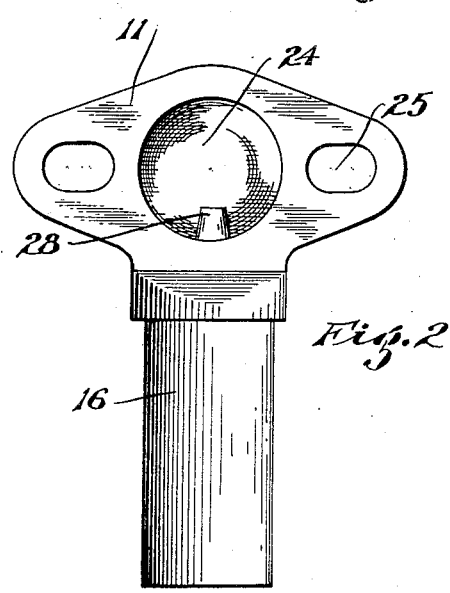
Fig. 2 is a view in elevation of the device.
Figure 3:
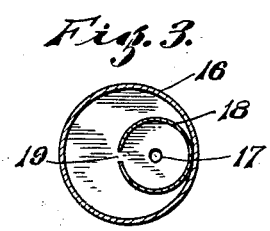
Fig. 3 is a horizontal section through the device taken on line 3—3 of Fig. 1.

The lower end of the head member is cylindrical in shape and is threaded at 15 to receive a cylindrical shell 16. The bottom of this shell is closed and has an inlet opening 17, therethrough. Secured within the shell 16 is a cylindrical valve cage 18. As shown in Figs. 1 and 3, the valve cage is eccentrically disposed in the shell 16 and is formed with a longitudinal slot 19. Within the valve cage is a valve member 20 which is normally maintained in its lowermost position by gravity and a compression spring 21, thus normally maintaining the valve 20 in a closing position over the inlet opening 17 to prevent the admission of air therethrough.

As shown in Fig. 1, the head member 11 is formed with a vertical passageway 22 which connects the interior of the shell with the interior of the intake manifold. The flat upper portion 12 of the head member 11 is formed with a central aperture 23, over which is positioned a cup-shaped member 24. This member is formed of reticulated material and may be secured to the head member 11 in any suitable manner.

In operation, the device is assembled as shown in the drawings, the flat portion 12 of the head member being positioned between the contiguous flanges of the intake manifold and the carbureter. The device may then be secured in position by bolts connecting the flanges of the manifold and carbureter, the bolts passing through the openings 25 in the head member 11.

On the suction stroke of the engine, the suction acting through the intake manifold will raise the valve 20 and permit air to be drawn in the chamber 26 through the opening 17 and the slot 19, uniting with the fuel drawn from the carbureter. As the engine increases its running speed the valve member will continue to rise and uncover a greater length of the slot 18 and thereby admitting a greater quantity of air.

Attention is particularly directed to the upstanding lug 28 through which the passageway 22 extends. This arrangement prevents liquid fuel from draining from the manifold into the valve casing.

In actual practice it has been found that the air admitted to the manifold through the device enters the manifold at a high velocity. This tends to finely break any globules of fuel which may be drawn from the carbureter and as the amount of air admitted automatically increases as the engine speed accelerates, it is seen that a gaseous mixture will at all times be provided having the proper proportion of fuel and air, thus insuring economy in fuel consumption and maximum power from the engine.

While I have shown the preferred form of the invention it is to be understood that various changes in the construction, combination and arrangement of the various parts may be made by those skilled in the art without departing from the spirit of the invention as claimed.

Having thus described my invention what I claim and desire to secure by Letters Patent is:

1. In combination with a carbureter and the intake manifold of an internal combustion motor, of a valve mechanism comprising a head member adapted to be secured between the flanges of the manifold and the carbureter, said head member having an opening formed therein in alignment with the bore of the manifold, a reticulate cover for said opening, a cylindrical shell fixed at one end to said head member, a valve cage fixed eccentrically in said shell and having a longitudinal slot formed therein, said shell having an inlet opening formed in its bottom below the valve cage, a reciprocable valve member in said cage, a spring in the cage normally tending to maintain said valve member over said inlet opening to prevent the admission of air therethrough, a passageway formed in the head member communicating with the interior of the shell and the interior of the manifold through said opening in the head member whereby suction of the motor will raise said valve member and draw air into the manifold through the inlet opening of said slot and said passageway.

2. In combination with a carbureter and the intake manifold of an internal combustion motor, of a valve mechanism comprising a head member adapted to be secured between the flanges of the manifold and the carbureter, said head member having an opening formed therein in alignment with the bore of the manifold, a reticulate cover for said opening, a cylindrical shell fixed at one end to said head member, a valve cage fixed eccentrically in said shell and having a longitudinal slot formed therein, said shell having an inlet opening formed in its bottom below the valve cage, a reciprocable valve member in said cage, a spring in the cage normally tending to maintain said valve member over said inlet opening to prevent the admission of air therethrough, a passageway formed in the head member communicating with the interior of the shell and the interior of the manifold through said opening in the head member whereby suction of the motor will raise said valve member and draw air into the manifold through the inlet opening of said slot and said passageway, an upstanding lug formed on the head member within said opening through which lug said passageway extends, said lug being adapted to prevent liquid fuel from draining from the manifold into the shell.

CECIL F. PRATT.